United States Patent
Billy et al.

(10) Patent No.: US 10,967,686 B2
(45) Date of Patent: Apr. 6, 2021

(54) SYSTEM AND METHOD FOR DETECTING THE OPERATION OF THE ENGINE OF A MOTOR VEHICLE

(71) Applicants: Continental Automotive France, Toulouse (FR); Continental Automotive GmbH, Hannover (DE)

(72) Inventors: Stéphane Billy, Toulouse (FR); Sylvain Godet, Toulouse (FR); Mohamed Cheikh, Toulouse (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 16/971,159

(22) PCT Filed: Feb. 22, 2019

(86) PCT No.: PCT/FR2019/050409
§ 371 (c)(1),
(2) Date: Aug. 19, 2020

(87) PCT Pub. No.: WO2019/166718
PCT Pub. Date: Sep. 6, 2019

(65) Prior Publication Data
US 2021/0001672 A1    Jan. 7, 2021

(30) Foreign Application Priority Data

Feb. 27, 2018   (FR) ...................................... 1851672

(51) Int. Cl.
*B60C 23/02*   (2006.01)
*B60C 23/00*   (2006.01)
*B60C 23/04*   (2006.01)

(52) U.S. Cl.
CPC ........ *B60C 23/002* (2013.01); *B60C 23/0486* (2013.01)

(58) Field of Classification Search
CPC .. G01M 17/02; G01M 17/021; G01M 17/022; G01M 17/027; G01M 17/025;
(Continued)

(56) References Cited

U.S. PATENT DOCUMENTS 5,825,286 A * 10/1998 Coulthard ............. B60C 23/009
340/447
7,103,460 B1 * 9/2006 Breed ................. B60C 23/0408
701/29.1
(Continued)

FOREIGN PATENT DOCUMENTS

| EP | 1674299 A2 | 6/2006 |
|---|---|---|
| EP | 1849628 A | 10/2007 |
| GB | 2398875 A | 9/2004 |

OTHER PUBLICATIONS

International Search Report and Written Opinion for International Application No. PCT/FR2019/050409, dated Dec. 11, 2019, with partial translation, 7 pages.
(Continued)

*Primary Examiner* — Andre J Allen
(74) *Attorney, Agent, or Firm* — RatnerPrestia (57) ABSTRACT

A system for detecting the operation of the motor or engine of a motor vehicle equipped with at least one tire-pressure-monitoring-system transmitter including: a low-frequency stage including a resonant stage connected in series with an antenna, a processing stage, a first switch and a second switch, the first switch being connected to at least two capacitors so as to control the parallel connection of at least one of the capacitors, the second switch being connected to at least two resistors so as to control the parallel connection of at least one of the resistors, outputs of the low-frequency
(Continued)

stage being arranged to receive input from the processing stage, in order to transfer the perceived signal to a processor of the signal, which is configured to compare the level of the perceived signal to a preset threshold level.

10 Claims, 4 Drawing Sheets

(58) Field of Classification Search
CPC ...... G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/04; G01M 3/40; G01M 5/0091; G01M 7/02; G01M 99/00; G01M 99/002; B60C 23/0494; B60C 2019/004; B60C 23/0493; B60C 23/064; B60C 19/00; B60C 23/04; B60C 23/0488; B60C 23/0498; B60C 23/0496; B60C 23/0408; B60C 23/041; B60C 23/0411; B60C 23/06; B60C 23/20; B60C 11/246; B60C 23/0486; B60C 23/061; B60C 11/243; B60C 99/00; B60C 11/0083; B60C 13/003; B60C 2009/2038; B60C 23/004; B60C 23/02; B60C 23/0401; B60C 23/0406; B60C 23/0416; B60C 23/0433; B60C 23/0455; B60C 23/0459; B60C 23/0474; B60C 23/0489; B60C 23/0491; B60C 25/002; B60C 25/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/00; B60C 23/001; B60C 23/003; B60C 23/007; B60C 23/008; B60C 23/0413; B60C 23/0427; B60C 23/0447; B60C 23/0454; B60C 23/0457; B60C 23/0462; B60C 23/0471; B60C 23/0472; B60C 23/0476; B60C 23/0479; B60C 23/0484; B60C 23/065; B60C 23/066; B60C 23/10; B60C 25/0548; B60C 25/056; B60C 25/132; B60C 25/138; B60C 29/005; B60C 9/005; B60C 9/18; B60C 9/1807; B60C 9/20; B60C 9/28
USPC .................................................. 73/146–146.8
See application file for complete search history.

(56) References Cited

U.S. PATENT DOCUMENTS

| | | | | |
|---|---|---|---|---|
| 2005/0273218 A1* | 12/2005 | Breed | ..................... | B60R 21/20 701/2 |
| 2006/0244581 A1* | 11/2006 | Breed | ................. | B60C 23/0408 340/447 |
| 2008/0216567 A1* | 9/2008 | Breed | ..................... | B60N 2/888 73/146.5 |
| 2008/0284575 A1* | 11/2008 | Breed | .................. | H01H 35/146 340/438 |
| 2010/0090820 A1 | 4/2010 | Oba | | |
| 2012/0089299 A1* | 4/2012 | Breed | .................... | B60N 2/888 701/36 |

OTHER PUBLICATIONS

International Search Report and Written Opinion for International Application No. PCT/FR2019/050409, dated Dec. 11, 2019, 12 pages (French).
English Translation of the Written Opinion for International Application No. PCT/FR2019/050409, dated Dec. 11, 2019, 5 pages.

* cited by examiner

SYSTEM AND METHOD FOR DETECTING THE OPERATION OF THE ENGINE OF A MOTOR VEHICLE

CROSS REFERENCE TO RELATED APPLICATIONS

This application is the U.S. National Phase Application of PCT International Application No. PCT/FR2019/050409, filed Feb. 22, 2019, which claims priority to French Patent Application No. 1851672, filed Feb. 27, 2018, the contents of such applications being incorporated by reference herein.

FIELD OF THE INVENTION

The technical field of the invention is tire pressure monitoring systems, and more particularly the detection of movement of the vehicle with such systems.

BACKGROUND OF THE INVENTION

Systems for monitoring tire pressures, also known as tire pressure monitoring systems TPMS, have recently been rolled out on all motor vehicles following revision to the European standards concerned with motor vehicle safety and equipment.

A prior-art tire pressure monitoring system (TPMS) employed by a radio-frequency link comprises a TPMS tire-pressure-monitoring-system receiver connected to the electronic control unit of the vehicle, and at least one TPMS tire-pressure-monitoring-system transmitter placed in a wheel of the vehicle and connected to the measuring means of the tire pressure monitoring system TPMS. In general, each wheel of the vehicle is equipped with one TPMS tire-pressure-monitoring-system transmitter.

Each TPMS tire-pressure-monitoring-system transmitter is equipped with a high-frequency stage and with a low-frequency stage.

The high-frequency stage allows a data link to be set up with the TPMS receiver in order to exchange wheel measurement data with the vehicle.

The low-frequency stage allows the TPMS transmitter to be paired with the TPMS receiver, the wheel of the vehicle in which it is placed to be identified, and various diagnostics of the vehicle to be carried out on the wheel or by a tool on the wheel.

The TPMS transmitter is a stand-alone battery-powered system. An acceleration sensor is employed in order to switch the TPMS transmitter between its various operating modes depending on whether the vehicle is moving or not, and especially between a mode in which RF (acronym for radio-frequency) is periodically transmitted, which is called the driving mode, and a mode in which RF transmission is stopped, which is called the parking mode.

However, the acceleration sensor has a particularly high power consumption; hence its use decreases the battery life of the TPMS transmitter. Its presence also generates cost and weight requirements during the design phase.

The movement of the vehicle is correlated to the operation of its motor or engine, whether the vehicle is an electric, hybrid or ICE (acronym of internal-combustion engine) vehicle. In order not to be dependent on the presence of an acceleration sensor to determine whether the vehicle is moving, there is a need for a TPMS allowing it to be determined whether the motor or engine of the vehicle is in operation.

SUMMARY OF THE INVENTION

One aspect of the invention is a system for detecting the operation of the motor or engine of a motor vehicle equipped with at least one tire-pressure-monitoring-system transmitter. The tire-pressure-monitoring-system transmitter comprises:
a low-frequency stage comprising a resonant stage connected to receive input from an antenna and to deliver output to a processing stage,
a first switch connected in series with a second switch, the assembly being connected in series between the antenna, the resonant stage and the processing stage,
the first switch being connected to at least two capacitors so as to control the parallel connection of at least one of said capacitors, in order to modify the equivalent capacitance of the low-frequency stage,
the second switch being connected to at least two resistors so as to control the parallel connection of at least one of said resistors, in order to be able to modify the equivalent resistance of the low-frequency stage,
outputs of the low-frequency stage being arranged to receive input from the processing stage, in order to transfer the perceived signal to means for processing the signal, which are configured to compare the level of the perceived signal to a preset threshold level in order to determine whether the motor or engine of the vehicle is in operation.

The means for processing the signal may be digital signal-processing means that are configured to extract the data carried by a low-frequency signal received by the antenna and that are configured to compare the level of the perceived signal to the preset threshold level in order to determine whether the motor or engine of the vehicle is in operation.

The means for processing the signal may comprise an analog comparator of operational-amplifier type connected to the outputs of the low-frequency stage in parallel with the signal-processing means that are configured to extract the data carried by a low-frequency signal received by the antenna, the comparator moreover being connected to a voltage source the amplitude of which depends on a preset threshold level, the comparator being configured to compare the level of the perceived signal to the preset threshold level in order to determine whether the motor or engine of the vehicle is in operation.

Another aspect of the invention is a method for detecting the operation of the motor or engine of the vehicle equipped with a tire-pressure-monitoring-system transmitter as claimed in any one of the preceding claims, comprising the following steps:
the amplitude of the signal perceived by the antenna is measured, using the low-frequency stage, for a first length of time,
it is determined whether a noise characteristic of a motor-vehicle motor or engine is present,
if such is the case, the amplitude of the signal is measured again, using the low-frequency stage, for a second length of time shorter than the first length of time,
it is determined whether the amplitude of the measured signal is higher than a preset amplitude threshold,
if such is the case, it is determined whether the number of occurrences of comparison of the amplitude of the measured signal is equal to a preset number,
if the number of occurrences of comparison of the amplitude of the measured signal is not equal to a preset number, the number of occurrences is incremented by one unit and the method is resumed by measuring again the amplitude of the signal, using the low-frequency signal, for a second length of time, if the number of occurrences of comparison of the amplitude of the measured signal is equal to a preset number, the detection of the operation of the motor or engine is concluded.

To determine the presence of motor-vehicle motor or engine noise, the following steps may be carried out:

narrow-band frequency filtering is carried out in order to detect the operation of an electric motor, it is determined whether the amplitude of the signal perceived by the low-frequency stage is higher than a preset threshold, if such is the case, the determination of an electric motor in operation is concluded, if such is not the case, wide-band frequency filtering is carried out in order to detect the operation of an internal-combustion engine, it is determined whether the algebraic noise-level mean perceived by the low-frequency stage for a second frequency and for at least two quality factors is higher than a predefined threshold, and if such is the case, the determination of an internal-combustion engine in operation is concluded.

To carry out narrow-band frequency filtering in order to detect the operation of an electric motor, the following steps may be carried out:

the switches of the low-frequency stage of the tire-pressure-monitoring-system transmitter are controlled so as to obtain an equal first frequency and a first quality factor, the amplitude of the signal perceived by the low-frequency stage is then determined, it is determined whether the amplitude of the signal perceived by the low-frequency stage is higher than a preset threshold, if such is not the case, the band number is incremented by one unit and the switches are controlled to obtain a new frequency higher than the first frequency depending on the new band number while keeping the first quality factor, and the method is resumed by determining the amplitude of the signal perceived by the low-frequency stage.

To carry out wide-band frequency filtering in order to detect the operation of an internal-combustion engine, the following steps may be carried out:

the switches of the low-frequency stage of the tire-pressure-monitoring-system transmitter are controlled so as to obtain a predefined second frequency and a second quality factor, the amplitude of the signal is determined for the second quality factor, it is determined whether the quality-factor index is equal to a predefined quality-factor-index value, if such is not the case, the quality-factor index is incremented and the method is resumed by controlling the switches of the low-frequency stage of the tire-pressure-monitoring-system transmitter so as to obtain, from the predefined list of quality factors, a new quality factor equal to the quality factor associated with the quality-factor index, if the quality-factor index is equal to the predefined value of the quality-factor index, the algebraic noise-level mean associated with each quality factor is determined.

To determine whether the motor or engine is still in operation, the following steps may be carried out:

the amplitude of the signal is measured, using the low-frequency stage, for a third length of time, it is determined whether the amplitude of the measured signal is higher than the preset amplitude threshold, if such is the case, it is determined whether the number of occurrences of comparison of the amplitude of the measured signal is equal to a preset number, if such is not the case, the number of occurrences is incremented by one unit, and the method is resumed by measuring the amplitude of the signal for the first length of time, and if the number of occurrences of comparison of the amplitude of the measured signal is equal to the preset number, it is determined that the motor or engine is still in operation.

Another aspect of the invention is a method for controlling a motor-vehicle tire-pressure-monitoring-system transmitter, comprising steps of determining the operation of the motor or engine of the motor vehicle and a step of determining whether the motor or engine is still in operation, wherein the following steps are carried out:

it is determined whether the motor or engine of the motor vehicle is in operation, if the motor or engine of the motor vehicle is in operation, the tire-pressure-monitoring-system transmitter is switched to a driving mode, if the motor or engine of the motor vehicle is not in operation, the tire-pressure-monitoring-system transmitter is controlled to a parking mode.

BRIEF DESCRIPTION OF THE DRAWINGS

Other aims, features and advantages of aspects of the invention will become apparent on reading the following description, given solely by way of nonlimiting example, and with reference to the appended drawings, in which.

DETAILED DESCRIPTION OF THE PREFERRED EMBODIMENTS

An internal combustion engine is a noise source, both in the acoustic domain and in the low-frequency domain. Specifically, the elements allowing the engine to be controlled, the alternator, the spark plugs or other pieces of electrical/electronic equipment generate low-frequency noise in an entire frequency band. Such low-frequency noise is illustrated in FIGS. 1 and 2 for electric and internal combustion engine vehicles.

Figure 1:
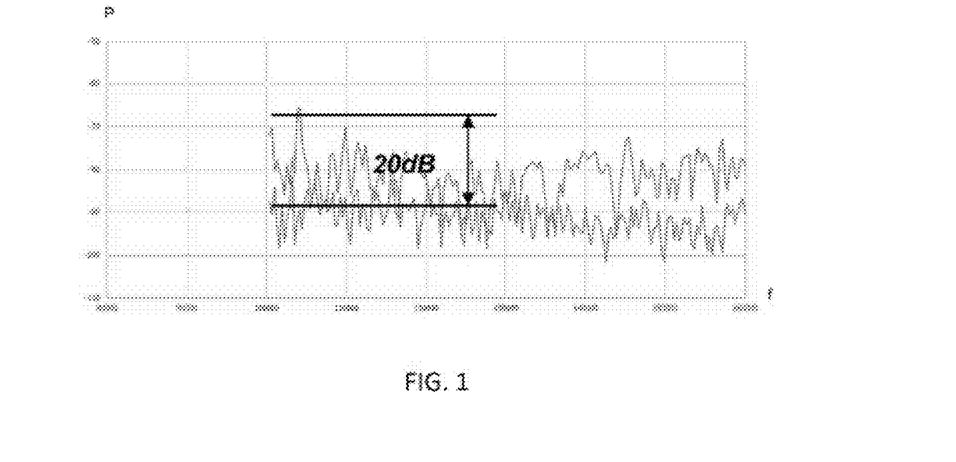
FIG. 1 illustrates the power/frequency spectrum in the low-frequency domain of an internal combustion engine powertrain.

FIG. 1 illustrates the power/frequency spectrum in the low-frequency domain of an internal combustion engine powertrain and the background power/frequency spectrum when the powertrain is turned off. It may be seen that the average power of the spectrum is increased by 20 dB in a wide frequency band when the powertrain is in operation.

Figure 2:
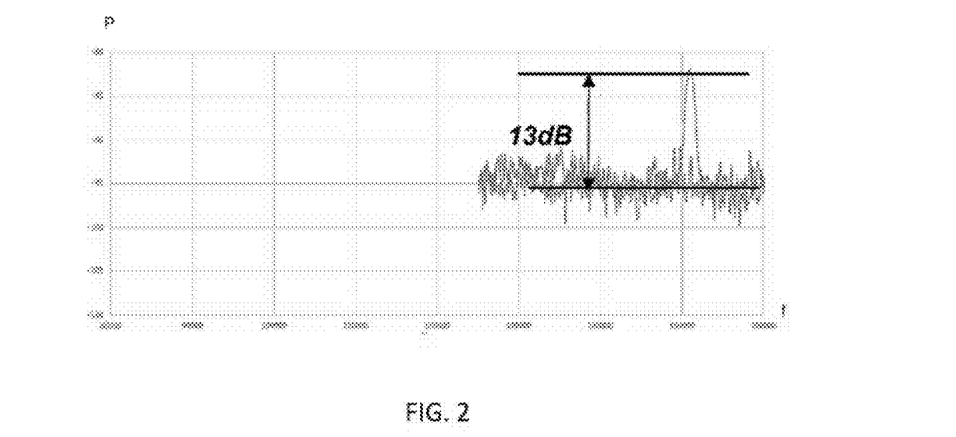
FIG. 2 illustrates the power/frequency spectrum in the low-frequency domain of an electric powertrain.

Similarly, FIG. 2 illustrates the power/frequency spectrum in the low-frequency domain of an electric powertrain and the background power/frequency spectrum when the powertrain is turned off. It may be seen that the average power of the spectrum is increased by 13 dB in a narrow frequency band when the powertrain is in operation.

Although the frequency band in which the increase in power occurs is different in the case of an internal combustion engine and in the case of an electric motor, the emission frequencies on which these bands are centered are similar. Likewise, the powers measured during the operation of the powertrains are similar.

The signature of the operation of a powertrain being in the low-frequency domain, the inventors had the idea of employing the low-frequency stage of the TPMS transmitter to detect it. Since the low-frequency stage is hardly used during the routine life of the TPMS transmitter, such a use has very little bearing on the operation of the TPMS transmitter.

Figure 3:
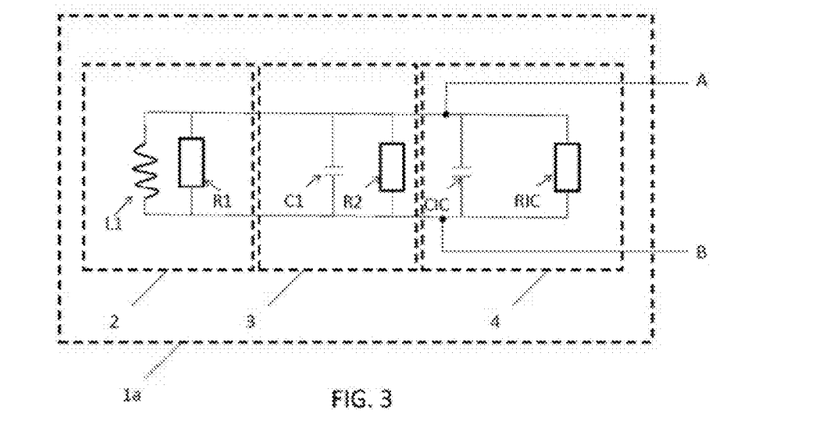
FIG. 3 illustrates the main elements of a low-frequency stage of a prior-art tire-pressure-monitoring-system transmitter.

The main elements of a low-frequency stage of a prior-art TPMS transmitter may be seen in FIG. 3.

The low-frequency stage, which is referenced 1a, comprises an antenna, which is referenced 2, a resonant stage, which is referenced 3, and a processing stage, which is referenced 4.

The antenna 2 generally comprises an inductor L1 connected in parallel with a resistor R1.

The resonant stage 3 is connected to receive input from the antenna 2 and to deliver output to the processing stage 4. The resonant stage 3 comprises a capacitor C1 and a resistor R2 that are connected in parallel between the input and output of the resonant stage 3.

The processing stage 4 comprises an integrated resistor RIC and an integrated capacitor CIC that are connected in parallel to the input.

Outputs A, B are arranged to receive input from the processing stage 4, in order to transfer the perceived signal to means for processing the signal, with a view to extracting received data.

The various components of such a low-frequency stage 1a are chosen so as to receive the information carried by a wave of frequency $f_0$ given by the following equation:

$$f_0 = \frac{1}{2\pi\sqrt{L_{eq}C_{eq}}} \quad (Eq.1)$$

with:
$L_{eq}$: the equivalent inductance of the components of the low-frequency stage 1a,
$C_{eq}$: the equivalent capacitance of the components of the low-frequency stage 1a.

The value of the quality factor Q that characterizes the spectral full width at half maximum is also dependent on the value of the various components of the low-frequency stage 1a.

$$Q = \frac{1}{R_{eq}}\sqrt{\frac{L_{eq}}{C_{eq}}} \quad (Eq.2)$$

with:
$R_{eq}$: the equivalent resistance of the components of the low-frequency stage.

It will thus be understood that spectral band received and processed by the low-frequency stage 1a is dependent on the values $R_{eq}$, $L_{eq}$, $C_{eq}$.

As was seen above in relation to FIGS. 1 and 2, the emission spectral band of an internal combustion engine is broader and higher in amplitude than the spectral band of an electric motor, while being centered on a similar frequency.

It is thus necessary to be able to modify the values $R_{eq}$, $L_{eq}$, $C_{eq}$ in order to perform a band selection depending on the type of motor or engine with which the vehicle equipped with the TPMS is provided.

Figure 4:
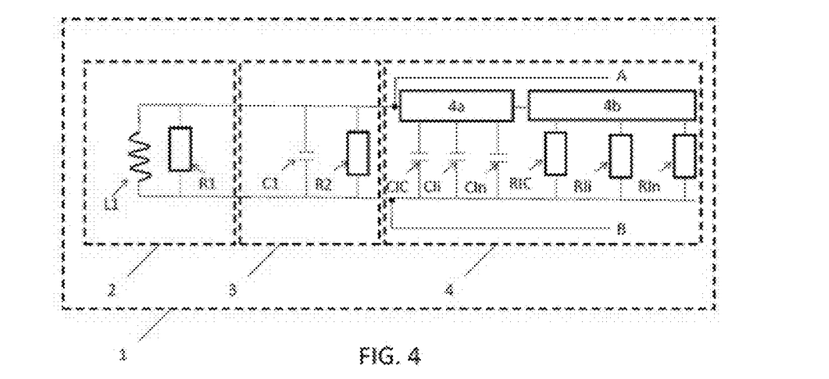
FIG. 4 illustrates the main elements of a low-frequency stage of a tire-pressure-monitoring-system transmitter according to an aspect of the invention.

To do this, a low-frequency stage such as illustrated in FIG. 4, in which figure the low-frequency stage is referenced 1, is proposed. The prior-art low-frequency stage 1a and the low-frequency stage 1 share an antenna and a resonant stage that are similar. To keep the present description concise, these elements will not be described and the reader is referred to the description given in relation to FIG. 3. Elements bearing the same reference are similar.

The low-frequency stage 1 comprises a first switch 4a connected to the integrated capacitor CIC and other capacitors CIi and CIn. It will be understood that the first switch 4a may be connected to n integrated capacitors, and that it may be able to connect a number i among the n integrated capacitors. By judiciously choosing the value of the connected capacitors, it is thus possible to modify the equivalent capacitance of the low-frequency stage 1 so as to obtain any desired value.

Similarly, a second switch 4b is connected in series with the first switch 4a.

The second switch 4b is connected to the integrated resistor RIC and to other resistors RIi and RIn. It will be understood that the second switch 4b may be connected to n integrated resistors, and that it may be able to connect a number i among the n integrated resistors. By judiciously choosing the value of the connected resistors, it is thus possible to modify the equivalent resistance of the low-frequency stage so as to obtain any desired value.

Thus, depending on the values obtained by switching the integrated switches 4a, 4b, it is possible to modify the value of the frequency of the stage 1 and its quality factor. For example, by modifying the equivalent resistance $R_{eq}$, it is possible to modify the quality factor while preserving the same frequency. Likewise, by modifying the equivalent resistance $C_{eq}$, it is possible to modify the frequency while preserving the same quality factor.

It is thus possible to pass from a wide-band detection to a narrow-band detection with the same low-frequency stage 1.

In one particular embodiment, it is possible to provide a comparator of operational-amplifier type connected to the outputs A, B in order to compare the level of the perceived signal to a memorized value with a view to concluding whether the motor or engine is in operation.

Such an embodiment makes it possible to avoid using the digital processing means that are typically present in such a low-frequency stage in order to decode and to process the information present in the received low-frequency signal. Such means are overdesigned with respect to the processing operations to be carried out to detect the presence of a motor or engine in operation, and have a particularly high power consumption with respect to an operational amplifier. Such an embodiment allows the power consumption of the TPMS transmitter to be even further decreased.

The steps of the method for detecting the operation of the motor or engine of the vehicle equipped with a TPMS transmitter comprising a low-frequency stage 1 will now be described.

Figure 5:
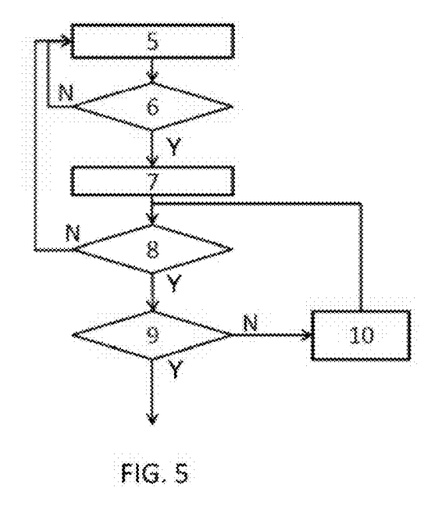
FIG. 5 illustrates the main steps of a method for detecting the operation of the motor or engine of the vehicle.

The main steps of a method for detecting the operation of the motor or engine of the vehicle may be seen in FIG. 5.

In a first step 5, the amplitude of the signal is measured, using the low-frequency stage 1, for a first length of time.

In a second step 6, it is determined whether a noise characteristic of a motor-vehicle motor or engine is present. If such is not the case, the method returns to the first step 5.

If such is the case, the method continues with the third step 7, in which the amplitude of the signal is measured again, using the low-frequency stage 1, for a second length of time shorter than the first length of time.

The method then continues with the fourth step 8, in which it is determined whether the amplitude of the measured signal is higher than a preset amplitude threshold. Those skilled in the art will be able to set such a threshold depending on the power spectra of the motor or engine when it is and is not in operation, i.e. spectra such as illustrated in FIGS. 1 and 2.

If such is not the case, the method returns to the first step 5.

If such is the case, the method continues with a fifth step 9 in which it is determined whether the number of occurrences of comparison of the amplitude of the measured signal is equal to a preset number.

If such is not the case, the method continues with a sixth step 10 in which the number of occurrences is incremented by one unit. The method then returns to the fourth step 8.

If such is the case, the method ends with a detection of the operation of the motor or engine.

It is then possible to treat the detection of the operation of the motor or engine similarly to the detection of the movement of the vehicle via an acceleration sensor. It is especially possible to switch the operating mode of the TPMS transmitter so as to begin to periodically emit RF.

Figure 7:
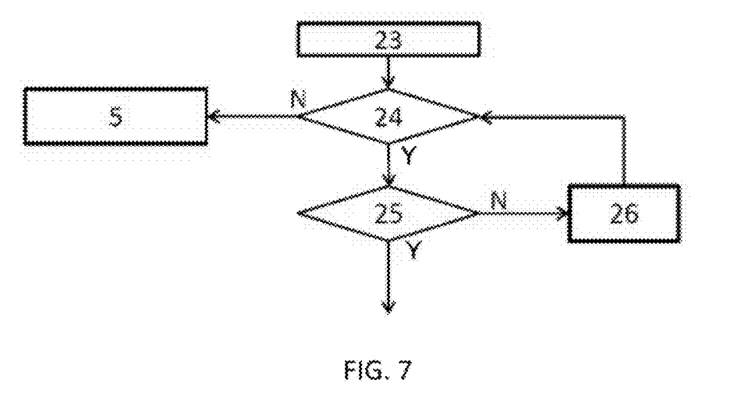
FIG. 7 illustrates the main steps of a method for monitoring the continuity of operation of the motor or engine.

In one particular embodiment, the method continues with monitoring of the continuity of operation of the motor or engine, as illustrated in FIG. 7, how this is done being described below.

Figure 6:
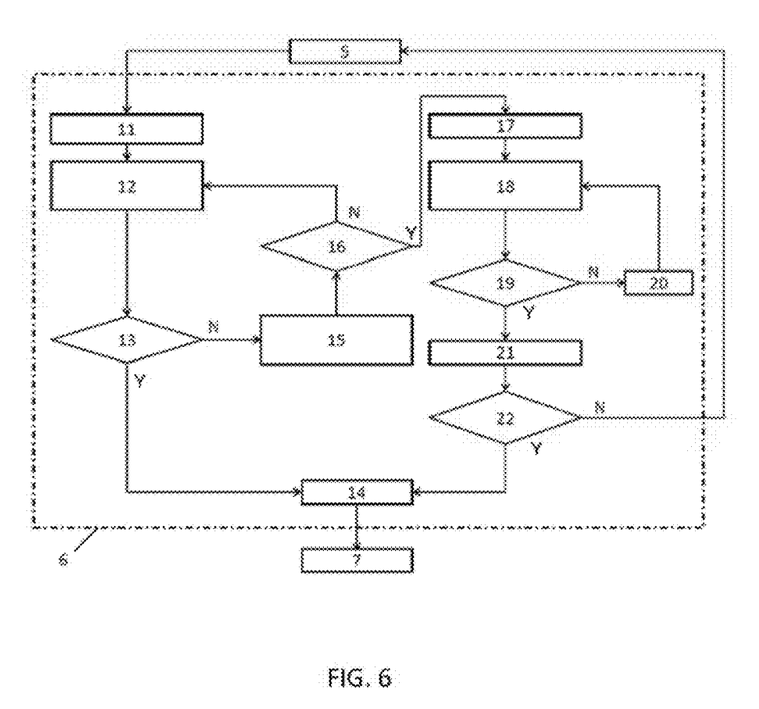
FIG. 6 illustrates the main sub-steps of a step of determining the presence of noise characteristic of a motor-vehicle motor or engine.

The sub-steps comprised in step 6 of determining the presence of noise characteristic of a motor-vehicle motor or engine, such as illustrated in FIG. 6, will now be described.

In a sub-step 11, narrow-band frequency filtering is carried out in order to detect the presence of a spectral peak associated with an electric motor.

To do this, the switches 4a, 4b of the low-frequency stage 1 of the TPMS transmitter are controlled so as to obtain a first frequency equal to the frequency of the lower band and a first quality factor.

In a step 12, the amplitude of the signal perceived by the low-frequency stage 1 is then determined.

In a step 13, the amplitude of the signal perceived by the low-frequency stage 1 is compared to a preset threshold. If the amplitude of the signal is higher than the preset threshold, the method continues with step 14 in which the presence of noise characteristic of an electric motor in operation is concluded. The determination of the presence of noise also allows the low-frequency stage 1 to be configured to determine the amplitude of the narrow-band signal.

If such is not the case, the band number is incremented by one unit in step 15.

In step 16, it is determined whether the band number is higher than the maximum band number. The maximum band number corresponds to the frequency of the lower band and the frequency of the higher band divided by the frequency difference associated with the quality factor.

If such is not the case, the method returns to step 12 via control of the switches to obtain a new frequency higher than the first frequency depending on the new band number, while keeping the first quality factor. The new frequency is equal to the sum of the frequency of the lower band and of the product of the band number multiplied by the frequency difference associated with the quality factor.

If such is the case, the method continues with step 17 in which wide-band frequency filtering is carried out in order to detect the presence of spectral noise associated with an internal combustion engine.

To do this, the switches 4a, 4b of the low-frequency stage 1 of the TPMS transmitter are controlled so as to obtain a predefined second frequency and a second quality factor.

In a step 18, the amplitude of the signal is determined for the second quality factor.

The method continues with a step 19 in which it is determined whether the quality-factor index is equal to a predefined quality-factor-index value, By quality-factor index, what is meant is the index indicating the quality factor in question among a predefined list of quality factors comprising a number of distinct quality factors at least equal to the predefined value of the quality-factor index.

If such is not the case, the method continues with a step 20 in which the quality-factor index is incremented. The method then returns to step 18 via control of the switches 4a, 4b of the low-frequency stage 1a of the TPMS transmitter so as to obtain, from the predefined list of quality factors, a new quality factor equal to the quality factor associated with the quality-factor index in question. A new signal amplitude associated with the new quality factor is determined.

If such is the case, the method continues with a step 21 in which the algebraic noise-level mean associated with each quality factor is determined.

In a step 22, it is determined whether the algebraic noise-level mean is higher than a predefined threshold.

If such is the case, the method continues with step 14 in which the presence of a noise characteristic of an internal combustion engine in operation is concluded. The determination of the presence of noise also allows the low-frequency stage 1 to be configured to determine the amplitude of the wide-band signal.

If such is not the case, the method returns to step 5 of measuring the amplitude of the signal using the low-frequency stage 1.

In one particular embodiment, the method continues with monitoring of the continuity of operation of the motor or engine, so as to ensure that the motor or engine has remained in operation for the length of time in question. Such an embodiment is illustrated by FIG. 7.

The method then comprises a step 23 in which the amplitude of the signal is measured again, using the low-frequency stage 1, for a third preset length of time. In one particular embodiment, the third preset length of time is equal to the second preset length of time.

The method then continues with the step 24 in which it is determined whether the amplitude of the measured signal is higher than a preset amplitude threshold. Those skilled in the art will be able to set such a threshold depending on the power spectra of the motor or engine when it is and is not in operation, i.e. spectra such as illustrated in FIGS. 1 and 2.

If such is not the case, the method returns to step 5. Specifically, the motor or engine is not considered to be in operation as expected. It is thus necessary to carry out a new detection of operation, by returning the method to step 5.

If such is the case, the method continues with a step 25 in which it is determined whether the number of occurrences of comparison of the amplitude of the measured signal is equal to a preset number.

If such is not the case, the method continues with a step 26 in which the number of occurrences is incremented by one unit. The method then returns to the step 24.

If such is the case, the method ends with a detection of a continuity of operation of the motor or engine.

When a motor or engine is detected to be in operation, steps 23 to 26 may be looped and repeated again and again or periodically in order to monitor whether the motor has remained in operation.

The detecting system and method according to aspects of the invention allow low-frequency noise characteristic of the operation of an electric, internal combustion engine or hybrid powertrain to be detected. It is thus possible to replace the acceleration sensor used by the TPMS to switch operating mode with the system according to an aspect of the invention.

The invention claimed is:

1. A system for detecting the operation of the motor or engine of a motor vehicle equipped with at least one tire-pressure-monitoring-system transmitter, the tire-pressure-monitoring-system transmitter comprising:
   a low-frequency stage comprising a resonant stage connected to receive input from an antenna and to deliver output to a processing stage,
   a first switch connected in series with a second switch, the assembly being connected in series between the antenna, the resonant stage and the processing stage,
   the first switch being connected to at least two capacitors so as to control the parallel connection of at least one of said capacitors, in order to modify the equivalent capacitance of the low-frequency stage,
   the second switch being connected to at least two resistors so as to control the parallel connection of at least one of said resistors, in order to be able to modify the equivalent resistance of the low-frequency stage,
   outputs of the low-frequency stage being arranged to receive input from the processing stage, in order to transfer a perceived signal to means for processing the signal, which are configured to compare the level of the perceived signal to a preset threshold level in order to determine whether the motor or engine of the vehicle is in operation.

2. The system as claimed in claim 1, wherein the means for processing the signal are digital signal-processing means that are configured to extract the data carried by a low-frequency signal received by the antenna and that are configured to compare the level of the perceived signal to the preset threshold level in order to determine whether the motor or engine of the vehicle is in operation.

3. The system as claimed in claim 1, wherein the means for processing the signal comprise an analog comparator of operational-amplifier type connected to the outputs of the low-frequency stage in parallel with the digital signal-processing means that are configured to extract the data carried by a low-frequency signal received by the antenna, the comparator moreover being connected to a voltage source the amplitude of which depends on a preset threshold level, the comparator being configured to compare the level of the perceived signal to the preset threshold level in order to determine whether the motor or engine of the vehicle is in operation.

4. A method for detecting the operation of the motor or engine of the vehicle equipped with a tire-pressure-monitoring-system transmitter as claimed in claim 1, comprising:
   the amplitude of the signal perceived by the antenna is measured, using the low-frequency stage, for a first length of time,
   it is determined whether a noise characteristic of a motor-vehicle motor or engine is present,
   if such is the case, the amplitude of the signal is measured again, using the low-frequency stage, for a second length of time shorter than the first length of time,
   it is determined whether the amplitude of the measured signal is higher than a preset amplitude threshold,
   if such is the case, it is determined whether the number of occurrences of comparison of the amplitude of the measured signal is equal to a preset number,
   if the number of occurrences of comparison of the amplitude of the measured signal is not equal to a preset number, the number of occurrences is incremented by one unit and the method is resumed by measuring again the amplitude of the signal is, using the low-frequency signal, for a second length of time, and
   if the number of occurrences of comparison of the amplitude of the measured signal is equal to a preset number, the detection of the operation of the motor or engine is concluded.

5. The detecting method as claimed in claim 4, wherein, to determine the presence of motor-vehicle motor or engine noise, the following are carried out:
   narrow-band frequency filtering is carried out in order to detect the operation of an electric motor,
   it is determined whether the amplitude of the signal perceived by the low-frequency stage is higher than a preset threshold,
   if such is the case, the determination of an electric motor in operation is concluded,
   if such is not the case, wide-band frequency filtering is carried out in order to detect the operation of an internal-combustion engine,
   it is determined whether the algebraic noise-level mean perceived by the low-frequency stage for a second frequency and for at least two quality factors is higher than a predefined threshold, and
   if such is the case, the determination of an internal-combustion engine in operation is concluded.

6. The detecting method as claimed in claim 5, wherein, to carry out narrow-band frequency filtering in order to detect the operation of an electric motor, the following are carried out:
   the switches of the low-frequency stage of the tire-pressure-monitoring-system transmitter are controlled so as to obtain an equal first frequency and a first quality factor,
   the amplitude of the signal perceived by the low-frequency stage (1) is then determined,
   it is determined whether the amplitude of the signal perceived by the low-frequency stage is higher than a preset threshold, and
   if such is not the case, the band number is incremented by one unit and the switches are controlled to obtain a new frequency higher than the first frequency depending on the new band number while keeping the first quality factor, and the method is resumed by determining the amplitude of the signal perceived by the low-frequency stage.

7. The detecting method as claimed in claim 5, wherein, to carry out wide-band frequency filtering in order to detect the operation of an internal-combustion engine, the following steps are carried out:
- the switches of the low-frequency stage of the tire-pressure-monitoring-system transmitter are controlled so as to obtain a predefined second frequency and a second quality factor,
- the amplitude of the signal is determined for the second quality factor,
- it is determined whether the quality-factor index is equal to a predefined quality-factor-index value,
- if such is not the case, the quality-factor index is incremented and the method is resumed by controlling the switches of the low-frequency stage of the tire-pressure-monitoring-system transmitter so as to obtain, from the predefined list of quality factors, a new quality factor equal to the quality factor associated with the quality-factor index, and
- if the quality-factor index is equal to the predefined value of the quality-factor index, the algebraic noise-level mean associated with each quality factor is determined.

8. The detecting method as claimed in claim 1, wherein, to determine whether the motor or engine is still in operation, the following are carried out:
- the amplitude of the signal is measured, using the low-frequency stage (1), for a third length of time,
- it is determined whether the amplitude of the measured signal is higher than the preset amplitude threshold,
- if such is the case, it is determined whether the number of occurrences of comparison of the amplitude of the measured signal is equal to a preset number,
- if such is not the case, the number of occurrences is incremented by one unit, and the method is resumed by measuring the amplitude of the signal for the first length of time, and
- if the number of occurrences of comparison of the amplitude of the measured signal is equal to the preset number, it is determined that the motor or engine is still in operation.

9. A method for controlling a motor-vehicle tire-pressure-monitoring-system transmitter, comprising determining the operation of the motor or engine of the motor vehicle according to claim 4 and a step of determining whether the motor or engine is still in operation comprising:
- the amplitude of the signal is measured, using the low-frequency stage, for a third length of time,
- it is determined whether the amplitude of the measured signal is higher than the preset amplitude threshold,
- if such is the case, it is determined whether the number of occurrences of comparison of the amplitude of the measured signal is equal to a preset number,
- if such is not the case, the number of occurrences is incremented by one unit, and the method is resumed by measuring the amplitude of the signal for the first length of time, and
- if the number of occurrences of comparison of the amplitude of the measured signal is equal to the preset number, it is determined that the motor or engine is still in operation, and wherein the following are carried out:
- it is determined whether the motor or engine of the motor vehicle is in operation,
- if the motor or engine of the motor vehicle is in operation, the tire-pressure-monitoring-system transmitter is switched to a driving mode,
- if the motor or engine of the motor vehicle is not in operation, the tire-pressure-monitoring-system transmitter is controlled to a parking mode.

10. The detecting method as claimed in claim 6, wherein, to carry out wide-band frequency filtering in order to detect the operation of an internal-combustion engine, the following are carried out:
- the switches of the low-frequency stage of the tire-pressure-monitoring-system transmitter are controlled so as to obtain a predefined second frequency and a second quality factor,
- the amplitude of the signal is determined for the second quality factor,
- it is determined whether the quality-factor index is equal to a predefined quality-factor-index value,
- if such is not the case, the quality-factor index is incremented and the method is resumed by controlling the switches of the low-frequency stage of the tire-pressure-monitoring-system transmitter so as to obtain, from the predefined list of quality factors, a new quality factor equal to the quality factor associated with the quality-factor index, and
- if the quality-factor index is equal to the predefined value of the quality-factor index, the algebraic noise-level mean associated with each quality factor is determined.

* * * * *